Aug. 5, 1969   N. E. POLSTER ET AL   3,460,155
ANALOG DECIMAL RECORDER WITH OVERLAPPING RANGES
Filed March 31, 1967                           4 Sheets-Sheet 1
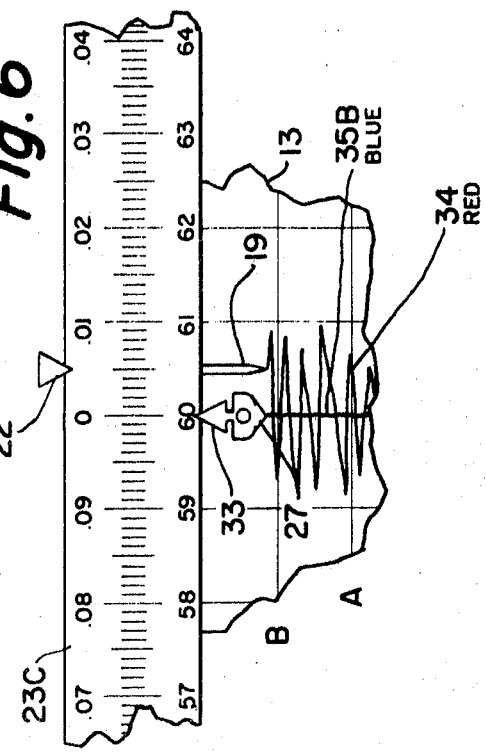
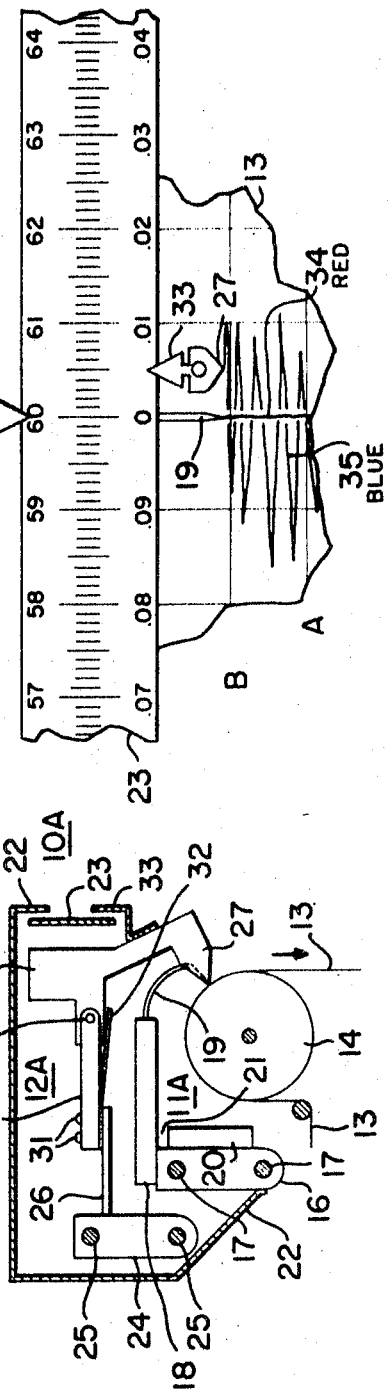
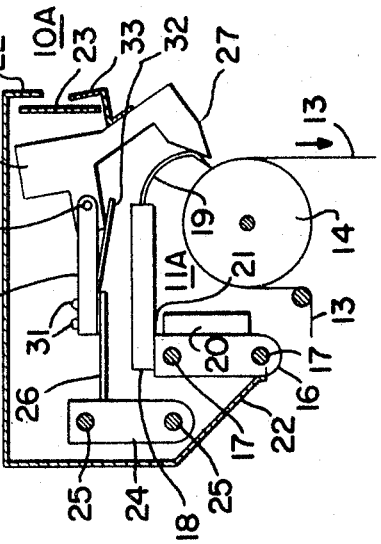

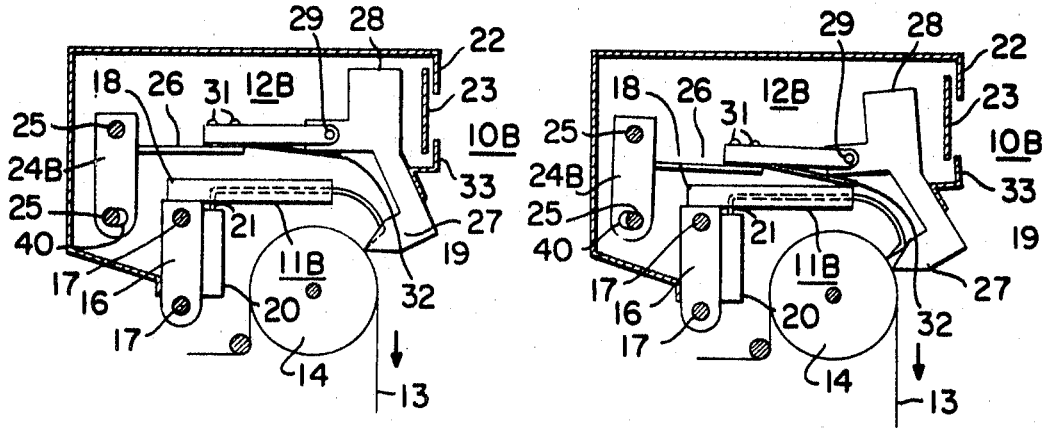
Fig. 4    Fig. 5
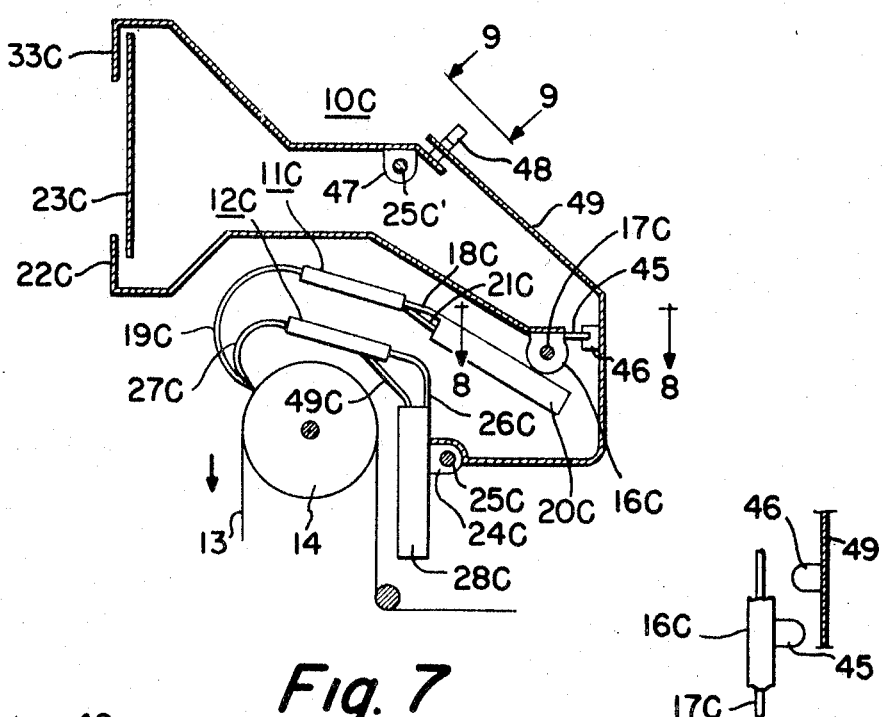
Fig. 7
Fig. 8
Fig. 9

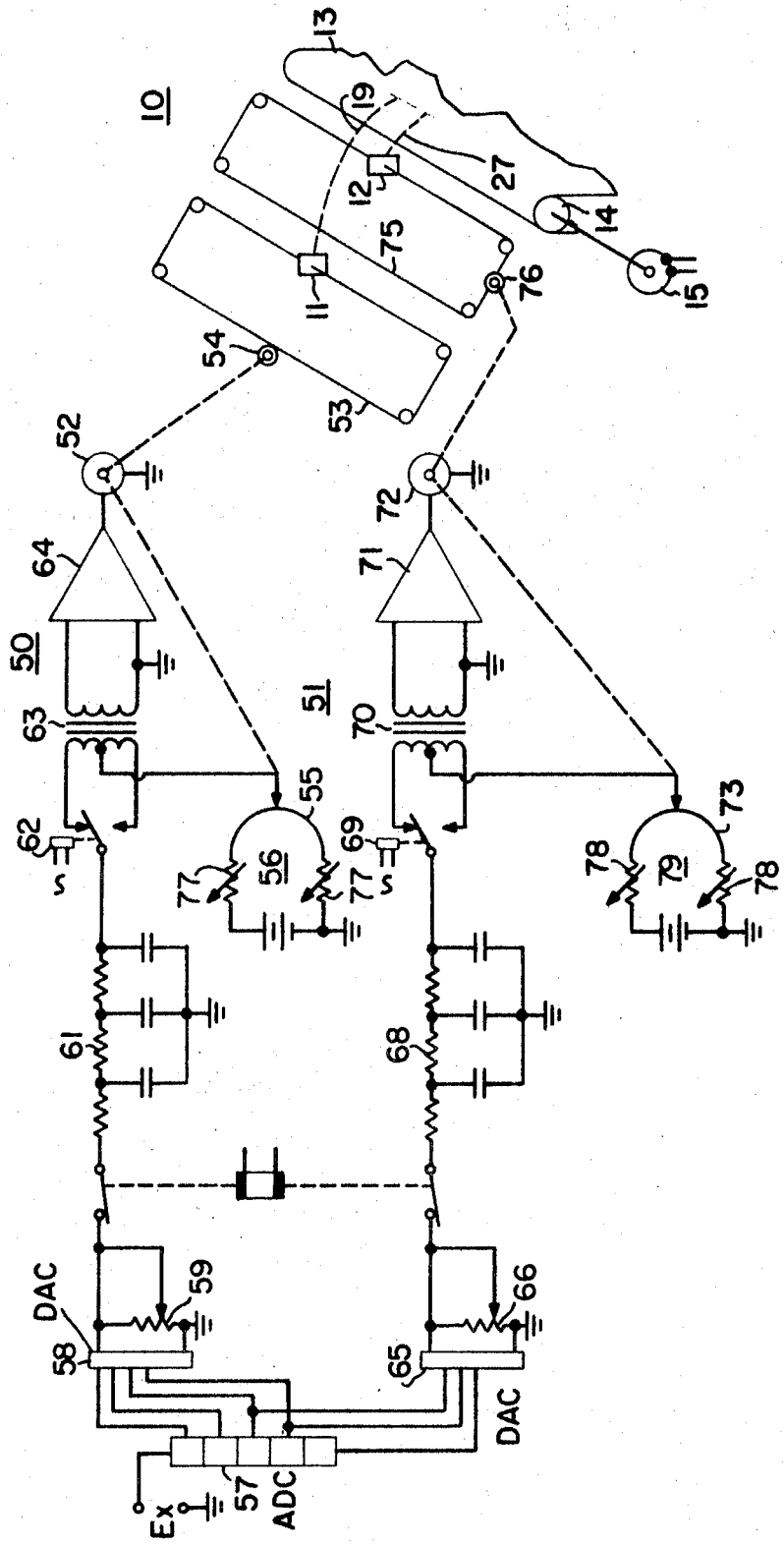

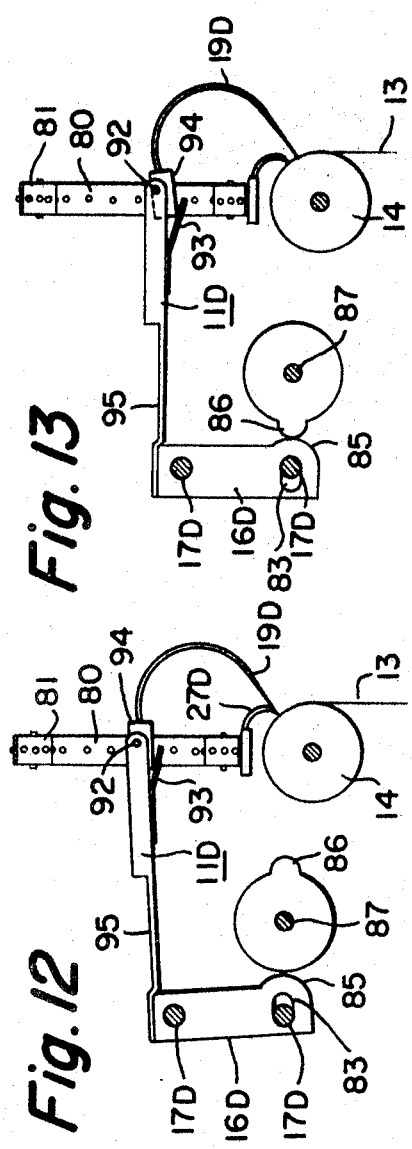
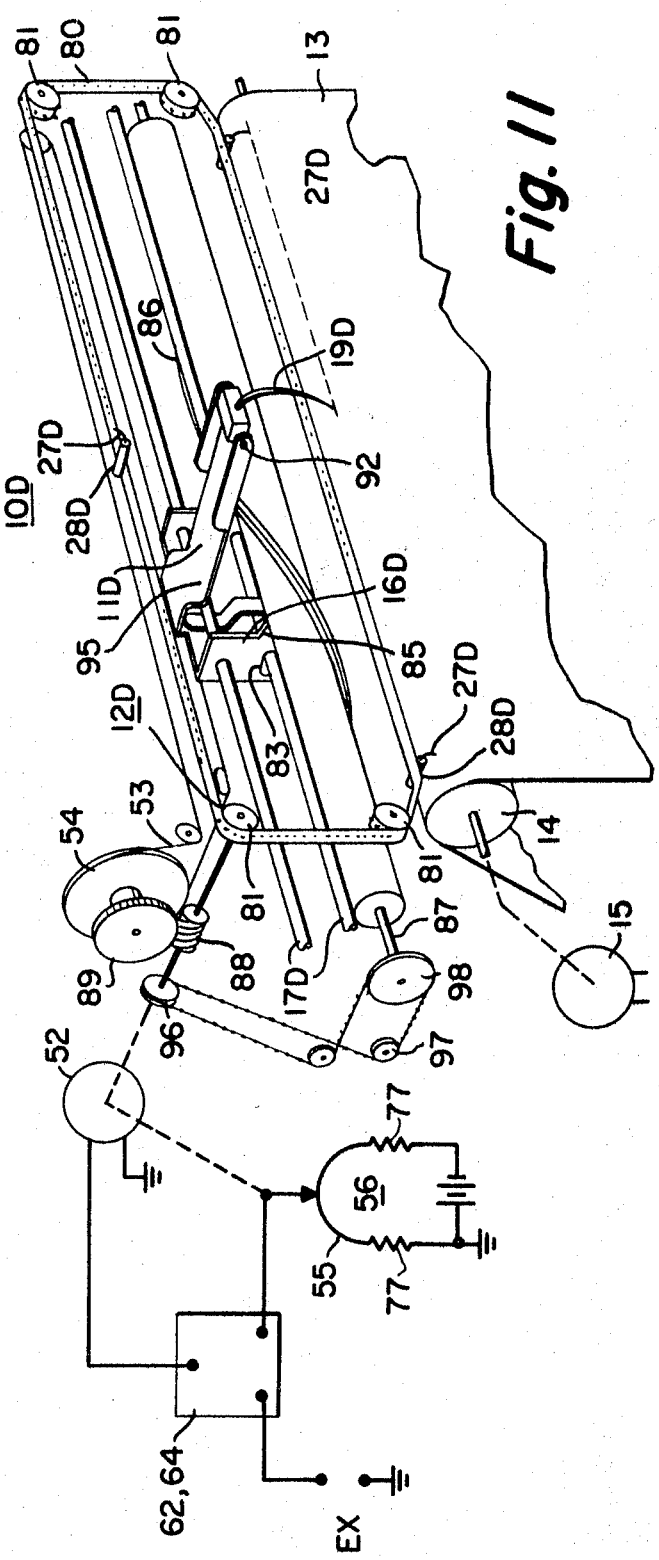

United States Patent Office 3,460,155
Patented Aug. 5, 1969

3,460,155
ANALOG DECIMAL RECORDER WITH
OVERLAPPING RANGES
Norman E. Polster, Southampton, Raymond W. Ross, Cheltenham, and Albert J. Williams, Jr., Philadelphia, Pa., assignors to Leeds & Northrup Company, Philadelphia, Pa., a corporation of Pennsylvania
Filed Mar. 31, 1967, Ser. No. 627,526
Int. Cl. G01d 9/02
U.S. Cl. 346—66                 14 Claims

ABSTRACT OF THE DISCLOSURE

Various two-pen recorder systems in which movements of the pens in response to changes of the same measured quantity are centesimally proportioned and in which provision is made for the pens to pass to produce superimposed analog records.

CROSS-REFERENCE TO RELATED APPLICATION

The two-pen recorder systems herein disclosed are suited for producing certain of the types of analog records disclosed in copending application Ser. No. 620,424, filed Mar. 3, 1967, now Patent No. 3,389,397.

BACKGROUND OF THE INVENTION

Field of the invention

The invention is concerned with systems for recording of the magnitude of a measured quantity such as, for example, temperature, pressure, frequency, voltage and the like.

Description of prior art

Woods et al. Patent 2,587,079 discloses a two-pen recorder in which the movements of the pens in response to changes of a measured quantity are in the ratio of twenty-to-one and produce analog record traces which are respectively within different regions of the chart.

Stein et al. Patent 2,673,136 discloses a two-pen recorder in which one pen traces along a marginal area of a chart a stepped record indicative of successive positions of a range-changing switch and in which the other pen traces in another area of the chart an analog record of the variations in a measured quantity occurring in the time intervals between successive steps of the marginal record.

An article entitled "An Automatic Recorder for Resistance Thermometry" (Review of Scientific Instruments, vol. 16, No. 11, pp. 318–321, November 1945) describes a two-pen recorder in which a time-displaced stepped record traced by a decade pen to indicate recorder range is recorded across the width of the chart on which is also recorded an analog record of a measured temperature traced by a second pen.

SUMMARY OF THE INVENTION

In accordance with the present invention, the movements of two recorder pens, or equivalent marking means, in response to changes of the same measured quantity, are proportioned, preferably centesimally, to produce superimposed analog records from which may be read respectively the more and less significant digits of the numerical value of the measured quantity, so to afford for a given width of chart wider divisions and hence readability having greater resolution than for records in different areas of a chart of the same width.

In some embodiments of the invention, the two pens are respectively driven in accordance with analog signals respectively corresponding with higher and lower-order digits of the numerical value of the measured quantity, and provision is made to permit the pens to pass so that each may use a common portion of the chart width for its analog trace. In the preferred dual-drive embodiments, the pens normally record on the same time-line of the chart, but in passing one of the pens is lifted from the chart or pushed aside while remaining in engagement with the chart.

In common-drive embodiments of the invention, proportioning of the movements of the two pens is effected mechanically, as by gearing. In the preferred common-drive embodiments, the pens normally record on the same time-line of the chart, but in passing one of the pens is lifted from the chart or pushed aside while remaining in engagement with the chart.

The invention further resides in two-pen recorder systems having features of construction, combination and arrangement hereinafter described and claimed.

BRIEF DESCRIPTION OF DRAWINGS

For a more detailed understanding of the invention, reference is made in the subsequent description of preferred embodiments thereof to the accompanying drawings in which:

FIGS. 1 and 2 are end elevational views, partly in section, respectively illustrating the normal and passing positions of the two pens of a pen lift-off embodiment of the invention;

FIG. 3 is exemplary of the type of centesimally-related analog records produced by the pen arrangement of FIGS. 1 and 2;

FIGS. 4 and 5 are end elevational views, partly in section, respectively illustrating the normal and passing positions of the two pens of a pen-push-aside embodiment of the invention;

FIG. 6 is exemplary of the type of analog records produced by the pen arrangement of FIGS. 4 and 5;

FIG. 7 is an end elevational view, partly in section, of another pen lift-off arrangement for producing the analog records shown in FIG. 3;

FIGS. 8 and 9 are detail views looking at FIG. 7 in the direction of lines 8—8 and 9—9 respectively;

FIG. 10 schematically illustrates analog-to-digital and digital-to-analog circuitry suited for independent drive of the pens of the arrangements shown in FIGS. 1, 2, 4, 5, and 7;

FIG. 11 is a schematic view, in perspective, of a two-pen step-aside passing arrangement in which the two pens have a common-drive with mechanical proportioning of their respective movements; and FIGS. 12 and 13 are end elevational views, partly in section, respectively illustrating the normal and passing positions of the pens of FIG. 11.

DESCRIPTION OF THE PREFERRED EMBODIMENTS

Referring to FIGS. 1 and 2, the recorder 10A has two marking means 11A, 12A movable across a chart 13 in response to changes in magnitude of a measured variable, for example, frequency. The chart 13 may be continuously advanced as a function of time as by a clock motor 15 (FIG. 10).

The first marking means 11A (FIGS. 1, 2) includes a carriage 16 supported by guides 17 extending, parallel to the axis of the chart roll 14, across the width of chart 13. The bracket 18 extending from carriage 16 supports a chart-marking element 19 whose tip continuously engages the chart 13. Specifically, the marking element 19 is a capillary pen and is supplied with ink via a flexible tube 21 from the reservoir 20 attached to carriage 16.

The second marking means 12A includes a carriage 24 supported by guides 25 also extending across the width of chart 13 in parallelism with the axis of chart roll 14. The bracket 26 extending from carriage 24 supports a subassembly including a second chart-marking element 27, which, as shown, may be a ball-point pen at the lower end of a gravity-feed ink reservoir 28. Near its upper end, the reservoir 28 is pivoted at point 29 to the free end of a forked bracket 30 adjustably fastened, as by screws 31, to the carriage bracket 26. The biasing spring 32 normally maintains the tip of pen 27 in engagement with the chart 13. The two pens 19, 27 may be aligned (FIG. 1) on a time-line of the chart 13 by temporarily loosening screws 31 and shifting the subassembly 27, 28, 30 toward or away from the carriage 24. With the construction and arrangement shown, both of the marking means 11A, 12A are free to move across the entire width of the chart and to pass one another at any region along their paths of travel. Normally both marking elements 19, 27 are in engagement with chart 13 and in line, but as a passing point is closely approached, the pen 27 is momentarily or temporarily lifted off the chart 13 (FIG. 2) by the camming engagement between the conical tip of pen 27 and the rounded outer surface of pen 19. Such engagement causes pen 27 and its supporting reservoir 28 to rock about pivot 29 in counterclockwise direction against the bias of spring 32. As the marking means 12A continues to move through and beyond the passing region, the spring 32 returns pen 27 into re-engagement with chart 13.

With the two-pen marking arrangement shown in FIGS. 1 and 2, the analog record 34 traced by pen 19 on chart 13 is a continuous line or curve (FIG. 3) and the analog record 35 traced by pen 27 has a small break or discontinuity at each point of crossing. For the type record shown in FIG. 3, the motions of the two marking means are so proportioned that for any given change in magnitude of the measured variable, specifically power-line frequency, the pen 27 is moved transversely of the chart 13 one hundred times as far as pen 19 and in the same direction. In the particular dual record shown in FIG. 3, the record 34 traced by pen 19 shows that over the time interval A to B, the monitored line frequency varies slightly within limits about the normal value of 60 cycles. From the coarse record 34, it is not possible accurately to read the frequency closer than about 0.1 cycle. However, from the concurrent fine record 35 traced by pen 27, it is easily possible to read frequency deviations as small as 0.001 cycle. For example, for the greatest negative deviation shown in FIG. 3, the frequency is clearly readable as 59.983 cycles per second, and for the greatest positive deviation shown in FIG. 3, the frequency is clearly readable as 60.012 cycles per second. If desired, the inks supplied to the two pens may be of different color, such as red and blue respectively.

The 100-to-1 or other desired ratio between the motions of the two marking means 11A, 12A of FIGS. 1, 2 may be effected either electronically for operation of a two-motor drive arrangement such as shown in FIG. 10, or mechanically for a single-motor drive arrangement such as shown in FIG. 11. Both of such proportional drive systems for the two pens are later herein described.

In construction, the two-pen recorder 10B of FIGS. 4 and 5 is quite similar to that of recorder 10A and the corresponding elements are identified by like reference characters. For brevity, the discussion of FIGS. 4 and 5 is principally directed to the dissimilarities of construction and operation of recorder 10B. In this embodiment, the carriage 24B of the second marking means 12B is slotted at 40 to embrace the lower guide 25 and is biased, as by spring 32, so that it is normally in the position shown in FIG. 4 with the lower guide 25 engaging the left-hand end of slot 40. Normally, both pens 19 and 27 are in engagement with chart 13 on the same time-line. As the pen 19 of the first marking means 11B closely approaches a passing region, it pushes pen 27 aside with consequent clockwise rocking movement of carriage 24B about the axis of its upper guide to lower the pivot point 29 of the pen 27 and its supporting well 28. Since in this embodiment the pivot 29 is a floating one, the pen 27 remains in engagement with the chart as it is passed by pen 19. In FIG. 6, a record made with this push-aside embodiment, is for the same frequency variations shown in FIG. 3. It differs from FIG. 3 in that pen 27 is used for the coarse frequency record and pen 19 is used for the fine frequency record. With the push-aside embodiment, no portion of the record is missing.

Again, the 100-to-1 or other proportioning between the motions of the two marking means 11B, 12B of FIGS. 4, 5 in response to changes of a measured variable or quantity, may be effected electronically or mechanically as by the arrangements shown in later-described FIGS. 10 and 11.

The recorder 10C shown in FIGS. 7 to 9 also has two markings means movable transversely of chart 13 preferably to centesimally proportioned extents in response to changes of a measured variable or quantity. The first marking means 11C includes a capillary pen 19C supported from bracket extension 18C of carriage 16C and supplied with ink by a flexible tube 21C from reservoir 20C. The pointer 22C is also attached to carriage 16C. The guide 17C supports the carriage 16C. A cam 45 extending from the carriage 16C cooperates, as later described, with a cam 46 of the second marking means 12C. The first marking means 11C is biased by its overhung weight or spring means not shown to maintain engagement between the tip of pen 19C and the chart 13.

The second marking means 12C includes a capillary pen 27C supported from bracket extension 26C of carriage 24C. Guide 25C supports carriage 24C for its movement parallel to the axis of the chart roll 14 and also serves as a pivotal axis for carriage 24C. Ink is supplied to the second pen 27C via flexible tube 26C from the reservoir 28C. The second marking means 12C is biased by its overhung weight or spring means, not shown, normally to maintain engagement between the tip of pen 27C and chart 13. The strip extension 49 of carriage 24C is provided with the aforesaid cam 46 for engagement by cam 45 of the first marking means 11C. The free end of extension strip 49 is slotted to receive the pin 48 projecting from pointer 33C. The carriage 47 for pointer 33C is movable along a guide 25C′ to a position corresponding with that of pen 27C by virtue of the pin and slot coupling with slotted extension strip 49 of the second marking means 12C.

Normally and a shown in FIG. 7, the two pens 19C, 27C are in alignment on chart 13 so that no time-correction is required in reading the curve made by either pen. As a passing point of the two marking means 11C, 12C is closely approached, the engagement of their respective cams 45, 46 effects temporary clockwise displacement of the second marking means 12C about guide 25C as a pivot. The pen 27C is thus lifted off chart 13 and into the clear path afforded by the large radius of curvature of pen 19C. In its continued movement transversely of the chart, pen 27 remains lifted until it passes completely over the tip of pen 19C and then resumes engagement with the chart. The dual record produced is similar to that shown in FIG. 3.

Again, with this embodiment the centesimal-proportioning of the movements of pens 19C, 27C transversely of the chart in response to changes of a measured variable may be effected either electronically or mechanically as in FIGS. 10 or 11.

In FIG. 10, the first marking means 11 of recorder 10 is coupled to one rebalancing motor 52, as by cord-and-pulley system 53, 54, and a second marking means 12 is coupled to a second rebalancing motor 72, as by another cord and pulley system 75, 76. Each of the two pens 19, 27 may be positioned at any point transversely of the chart by its respective drive system. Passing of the pens may be provided for by any of the lift-off or step-aside arrangements hereinbefore described, or by slightly physically offsetting one of the pens in the lengthwise or time-direction of chart 13.

In the recorder system of FIG. 10, the proportioning of the movements of the two pens in response to changes of the same measured quantity is effected electronically. Specifically, an analog signal $E_X$ corresponding with the magnitude of the measured quantity is applied to an analog-to-digital converter 57 (ADC). The resulting output signals from the decades of greater significance of ADC 57, including a decade of intermediate significance, are applied to a digital-to-analog converter 58 (DAC) and the output signals from the decades of less significance, including the decade of intermediate significance, are applied to a second digital-to-analog converter 65.

The DC analog output signal of converter 58 is balanced against the DC reference signal provided by slidewire 55 of potentiometer network 56. The range of variation of the reference signal affected by adjustment of the slidewire 55 corresponds with the expected range of variation of the measured variable. The unbalance or DC error signal is converted to an AC signal by a modulator, exemplified by chopper 62, and applied via transformer 63 to amplifier 64. The AC output of amplifier 64 is of magnitude and phase corresponding with the magnitude and polarity of the DC error signal. The motor 52 as energized by the output of amplifier 64 effects rebalancing adjustment of slidewire 55 to reduce the error signal to zero and concurrently moves the coarse pen 19 across chart 13 to a position corresponding with the more significant decades of the numerical value of the measured variable. Referring to FIG. 3, for example, the frequency as being recorded at the moment by coarse pen 19 is readable as definitely greater than 59.9 and definitely smaller than 60.1. In order to obtain more precise information on frequency, use must be made of the record produced by the fine pen 27.

The DC analog output signal of DAC 65 is opposed to the DC reference signal provided by slidewire 73 of potentiometer network 79. The range of variation of this second reference signal, afforded by adjustment of slidewire 73, is selected to obtain the desired proportionality between the movements of the two pens in response to changes in the same measured quantity. For example, with a 100-to-1 ratio of the movements of pens 19, 27, as used for producing the analog records of FIG. 3, the range of variation of slidewire 73 corresponds with 0.1 cycle. This second or minor order DC error signal is converted to an AC signal by a modulator exemplified by synchronized chopper 69 and is applied via signal transformer 70 to amplifier 71. The AC output of amplifier 71, corresponding in phase and magnitude with the polarity and magnitude of the minor order error signal, energizes the second rebalancing motor 72. Accordingly, the contact of slidewire 73 is moved by motor 72 in direction and to extent reducing the error signal to zero, and the second marking means, including the fine pen 27, is concurrently moved to a position of balance to afford a vernier or fine reading.

The end resistors 77 of network 56 may be selected or adjusted so that the coarse pen, its associated pointer and slidewire 55 are concurrently in mid-range position for centering of the range of movement of pen 19 with respect to chart 13. Usually such mid-range position corresponds with the desired normal value of the measured quantity, for example, 60 cycles in FIG. 3.

The end resistors 78 of network 79 may be selected or adjusted so that the fine pen 27, its associated pointer and slidewire 73 are also in the same mid-range position of the chart 13 for the desired value of the measured quantity. In FIG. 3, such mid-range position provides for the next lower reading of 0.099 and downwardly for the left-hand portion of the fine scale and for the next higher reading of 0.001 and upwardly for the right-and portion of that scale. For this type of recording with the range so divided around zero, the DAC apparatus 58, 65 is of modified type described in aforesaid copending application Ser. No. 620,424. With the mid-range position corresponding with 0.050 for a range from 0.00 to 0.099, a conventional DAC may be used.

The potentiometer 59 in the output circuit of the DAC 58 in the coarse-pen drive channel 50 is for matching of the range of variation of that DAC's output to the range of variation of coarse slidewire 55. Similarly, the potentiometer 66 in the output circuit of the lower order DAC 65 in the fine-pen drive channel 51 is for matching of the range of variation of that DAC's output to the range of variation of the fine slidewire 73.

The filter networks 61, 68 respectively in the major and minor drive circuits 50, 51 are to suppress any effect from electrical noise and to provide damping for the balancing motors 52, 72.

In the embodiment of the invention shown in FIGS. 11 to 13, a single drive motor 52 is used for both the coarse and fine marking means. Proportioning of their respective motions in response to changes of a measured variable is effected mechanically.

Specifically, the rebalancing motor 52 is coupled to carriage 16D of the coarse chart-marking means 11D by way of worm 88, worm gear 89, drive pulley 54 and cord 53. The coarse pen 19D is of capillary type and is fed via a capillary tube (not shown) from a reservoir (not shown). The pen 19D is pivotally mounted at 92 on the bracket extension 95 of carriage 16D. The pen 19D is biased into engagement with chart 13 by spring 93. The carriage 16D is slidably supported by guides 17D and is permitted to rock about the upper guide as a pivot by provision of slots 83 for receiving the lower guide.

The carriage 16D is biased to its normal angular position (FIG. 12) by spring means consisting of or including spring 93. The cam 85 extending from the lower part of carriage 16D is in the path of an elongated helical cam 86 (FIGS. 11, 12, 13) whose shaft 87 is parallel to the guides 17D. The helical cam 86 is rotated concurrently with linear movement of the fine marking means by a drive coupling exemplified by the bead chain and sprocket system 96, 97, 98. The pen carriage 16D is rotated or rocked in clockwise direction about upper guide 17D as a pivot (FIG. 13) upon engagement with cam 85 of the carriage 16D and the adjacent section of helical cam 86. Such motion results in lowering of pivot 92 and accordingly pen 19D moves out of the path of the fine pen 27D, preferably one of a group as now described.

The belt 80, as supported by pulleys 81, forms an open loop (FIG. 11) which surrounds the path of movement of the coarse pen 19D with the lower flight of the belt adjacent and parallel to such path. The reservoirs 28D of fine pens 27D are attached to the external face of belt 80 with peripheral spacing substantially equal to the width of chart 13. The belt 80 is driven by rebalancing motor 52 in such direction that a pen 27D in engagement with chart 13 is moved concurrently with and in the same direction as the coarse pen 19D and at a higher speed corresponding with the ratio of their mechanical drives from rebalancing motor 52. Each time a fine pen 27 approaches the passing point, the helical cam 86 moves the coarse pen 19D aside as above described, the coarse pen 19D remaining in engagement with the chart.

The motor 52 for driving marking means 11D, marking means 12D and helical cam 86 may be a component of any suitable rebalancing system responsive to changes of a measured variable. Specifically by way of example, motor 52 may be energized by the output of a chopper-amplifier combination 62, 64 whose input is the difference between a reference signal provided by slidewire 55 of a potentiometer network 56 and an analog signal representing the magnitude of the measured variable.

When the chart-marking elements are pens, as illustrated, the inks respectively provided for them are desirably of different colors and one of the inks may be translucent in order not to obscure the record at crossover points. It is also to be understood that other types of chart and marking means may be employed.

What is claimed is:

1. An automatic self-balancing recorder of type having coarse and fine chart-marking means for respectively simultaneously producing on a chart a first analog record of the variation in a measured quantity drawn to a scale readable to the more significant digits of the numerical value of said measured quantity and a second analog record of the variation in the same measured quantity drawn to a scale readable to the less significant digits of the numerical value of said measured quantity comprising the combination of actuating means for moving both said coarse and fine chart-marking means simultaneously to produce said analog records of variations of said measured quantity across a common portion of said chart, scale means having spaced reference marks, means for proportioning the simultaneous movements of said coarse and fine chart-marking means effected by said actuating means so that the same reference marks of said scale means may be used to read both the more significant and less significant digits of the numerical value of said measured quantity from said simultaneously recorded analog records, and means provided to permit said coarse and fine chart-marking means to pass each other as simultaneously moved by said actuating means to record changes in values of said measured quantity.

2. A self-balancing recorder system as in claim 1 in which the actuating means and the means to proportion the simultaneous movements of the course and fine chart-marking means respectively comprise two electromechanical drive systems respectively for said coarse chart-marking and said fine chart-marking means, and electrical means for deriving from an electrical signal corresponding with the magnitude of said measured quantity two signals respectively corresponding with higher and lower digits of the numerical value of the measured quantity and respectively applying said two signals as continuous inputs to said two electromechanical drive systems to effect simultaneous movements of the coarse and fine chart-marking means.

3. A self-balancing recorder system as in claim 1 in which the actuating means and the means to proportion the simultaneous movements of the coarse and fine chart-marking means respectively comprise a motor, two mechanical motion-transmission means respectively coupling said coarse and fine chart-marking means to said motor to effect simultaneous movement thereof, said mechanical motion-transmission means having input-output ratios differing by a constant decimal factor.

4. A self-balancing recorder system as in claim 1 including an arrangement momentarily to lift one of the chart-marking means from the chart for passage over the other of said chart-marking means during their simultaneous movement by said actuating means to record changes in value of said measured quantity.

5. A self-balancing recorder system as in claim 4 in which said one of the chart-marking means is pivotally mounted and biased normally to engage the chart, the engagement of cam surfaces associated with both of said chart-marking means effecting the momentary lifting of said one of the chart-marking means for passage over the other during their simultaneous movement by said actuating means to record changes in value of said measured quantity.

6. A self-balancing recorder system as in claim 5 in which said cam surfaces are provided by chart-engaging elements of said chart-marking means near their points of engagement with the chart.

7. A self-balancing recorder system as in claim 5 in which the respective chart-marking means have cam elements separate and distinct from the marking elements.

8. A self-balancing recorder system as in claim 1 including an arrangement momentarily to push one of said marking means aside along the chart during continued engagement therewith for passage of the other of said marking means during simultaneous movement of both of said marking means by said actuating means to record changes in value of said measured quantity.

9. An automatic self-balancing recorder of type having coarse and fine chart-marking means for respectively simultaneously producing on a chart a first analog record of the variation in a measured quantity drawn to a scale readable to the more significant digits of the numerical value of said measured quantity and a second analog record of the variation in the same measured quantity drawn to a scale readable to the less significant digits of the numerical value of said measured quantity comprising the combination of actuating means for moving both said coarse and fine chart-marking means simultaneously to produce said analog records of variations of said same measured quantity across a common portion of said chart, scale means having spaced reference marks, means for proportioning the simultaneous movements of said coarse and fine chart-marking means effected by said actuating means so that the same reference marks of said scale means may be used to read both the more significant and less significant digits of the numerical value of said measured quantity from said simultaneously recorded analog records, means provided to premit said coarse and fine chart-marking means to pass each other as simultaneously moved by said actuating means to record changes in value of said measured quantity, one of said chart-marking means comprising carriage structure pivotally supported on one of a pair of guide members therefor for limited rocking movement about a first pivotal axis with respect to the other of said pair of guide members, a chart-engaging element pivotally supported on said carriage structure for rocking movement about a second pivotal axis, spring means biasing said chart-engaging element into engagement with the chart and biasing said carriage structure to one limit of its rocking movement, and means effective to rock said chart-engaging element and said carriage structure respectively about said first and second pivotal axes and in opposition to their bias by said spring means for movement of said chart-engaging element of said one of said marking means to pass the corresponding chart-engaging element of the other of said marking means.

10. A self-balancing recorder system as in claim 9 in which the last-named means comprises cooperating cam surfaces provided by said chart-engaging elements.

11. An automatic self-balancing recorder of the type having coarse and fine chart-marking means for respectively simultaneously producing on a chart a first analog record of the variation in a measured quantity drawn to a scale readable to the more significant digits of the numerical value of said measured quantity and a second analog record of the variation in said measured quantity drawn to a scale readably to the less significant digits of the numerical value of the measured quantity characterized by means simultaneously to move both said coarse and fine chart-marking means in overlapping ranges including a common position of said chart in accordance with change in value of the same measured quantity to produce analog records of greater and lesser significance thereon, said coarse and fine chart-marking means being constructed and arranged to permit said coarse and fine chart-marking means to pass each other, means to proportion movement of said coarse and fine chart-marking means so that the same reference marks on a chart may be employed to determine both the more significant and less significant digits of the numerical value of said measured quantity from said simultaneously recorded analog records, one of said chart-marking means including
- carriage structure pivotally supported on one of a pair of guide members therefor for limited rocking movement with respect to the other of said pair of guide members,
- a chart-engaging element pivotally supported on said carriage structure for rocking movement,
- spring means biasing said chart-engaging element into engagement with the chart and biasing said carriage structure to one limit of its rocking movement, and
- means effective to rock said chart-engaging element and said carriage structure in opposition to their bias by said spring means for movement of said chart-engaging element to pass the corresponding chart-engaging element of the other of said marking means, said last-named rocking means including
  - a helical cam rotatable about an axis parallel to the path of travel of said carriage structure along said guide members and cooperative with said carriage structure to effect its aforesaid rocking movement, and
  - means for angularly positioning said helical cam in accordance with the position of the chart-engaging element of said other of the marking means.

12. A self-balancing recorder system as in claim 11 in which the other of said marking means comprises an endless loop carrying a plurality of marking elements equally spaced along the loop.

13. A recorder comprising
a first carriage structure slidably and non-rotatably supported by guide means extending across the width of a recorder chart,
a first marking element supported by said first carriage structure for continuous engagement with said chart along a straight line,
a second carriage structure slidably supported by spaced guide members extending across the width of said chart and having freedom of limited angular motion about one of said guide members as a fixed first pivotal axis,
a second marking element pivotally supported on said second carriage structure for angular motion about a floating second pivotal axis intermediate said first fixed pivotal axis and the chart-engaging end of said second marking element, and
spring means biasing said second carriage structure and said second marking element to press said second marking element into engagement with the chart along a line normally coincident with said aforesaid straight line but momentarily displaced during proximity engagement of said marking element as permitted by slightly angular motions of said second carriage structure and said second marking element about their respective pivots.

14. A recorder comprising
a first carriage structure supported by guide means for movement across the width of a recorder chart,
a first marking element supported by said first carriage structure and having a tip in continuous engagement with said chart along a straight line transversely of the chart,
a second carriage structure supported by guide means for movement across the width of a recorder chart,
a second marking element supported by said carriage structure,
means providing limited motion of the tip of said second marking element in direction lengthwise of the chart and having two pivotal axes permitting continuous engagement of said tip with the chart during such limited motion, and
biasing means pressing the tip of said second marking element into engagement with the chart along a line normally coincident with said aforesaid straight line but temporarily displaced as permitted by said two pivotal axes in direction lengthwise of the chart when pushed aside by engagement with the tip of the first marking element.

References Cited

UNITED STATES PATENTS

| | | | |
|---|---|---|---|
| 2,596,305 | 5/1952 | Stevens | 346—49 X |
| 2,661,260 | 12/1953 | Salzman | 346—65 |
| 2,673,136 | 3/1954 | Stein et al. | 346—33 |
| 2,724,631 | 11/1955 | Ruhland | 346—49 |
| 3,153,562 | 10/1964 | Witzany | 346—23 |
| 2,516,217 | 7/1950 | Keinath | 346—33 |
| 3,389,397 | 6/1968 | Lex et al. | 346—35 |

RICHARD B. WILKINSON, Primary Examiner
JOSEPH W. HARTARY, Assistant Examiner

U.S. Cl. X.R.
346—139

U.S. PATENT OFFICE

UNITED STATES PATENT OFFICE
CERTIFICATE OF CORRECTION

Patent No. 3,460,155　　　　　　　　　　Dated August 5, 1969

N. E. Polster Et Al

It is certified that error appears in the above-identified patent and that said Letters Patent are hereby corrected as shown below:

```
Column  4, line 17, change "markings" to --marking--
           line 48, change "a" to --as--
Column  5, line 73, change "right-and" to --right hand--
Column  7, line 40, after the word "lower" insert --order
Column  8, line 33, change "premit" to --permit--
Column 10, line 11, change "element" to --elements--
           lines 24 and 25, before the word "carriage"
                                    insert --second--
```

SIGNED AND
SEALED

JUN 16 1970

(SEAL)
Attest:

Edward M. Fletcher, Jr.
Attesting Officer

WILLIAM E. SCHUYLER, JR
Commissioner of Patents